United States Patent

Iwamura

[19]

[11] Patent Number: 5,838,876
[45] Date of Patent: Nov. 17, 1998

[54] FRAME-ACCURATE EDIT AND PLAYBACK IN DIGITAL STREAM RECORDING

[75] Inventor: Ryuichi Iwamura, San Diego, Calif.

[73] Assignees: Sony Corporation, Tokyo, Japan; Sony Electronics, Inc., Park Ridge, N.J.

[21] Appl. No.: 719,037

[22] Filed: Sep. 24, 1996

[51] Int. Cl.$^6$ .............................. H04N 5/781; H04N 5/85
[52] U.S. Cl. ........................................... 386/125; 386/126
[58] Field of Search .................................. 386/61, 52, 55, 386/4, 46, 83, 13, 15, 125, 126, 40, 124; H04N 5/781, 5/926, 5/85

[56] References Cited

U.S. PATENT DOCUMENTS 5,502,573  3/1996  Fujinami ................................. 386/109
5,517,321  5/1996  Yoshida ..................................... 386/83
5,568,275  10/1996  Norton et al. ............................ 386/52

*Primary Examiner*—Robert Chevalier
*Attorney, Agent, or Firm*—Blakely, Sokoloff, Taylor & Zafman LLP

[57] ABSTRACT

As an MPEG stream is playing out, e.g., from an MO drive or other source, an edit point is indicated. When the edit point is indicated, an entry is made into a computer readable table associated with the MPEG stream. The entry includes a first value representative of a presentation time stamp associated with a picture in the MPEG stream. The entry also includes a second value representative of a storage location on a media on which the MPEG stream being played out is stored.

5 Claims, 10 Drawing Sheets

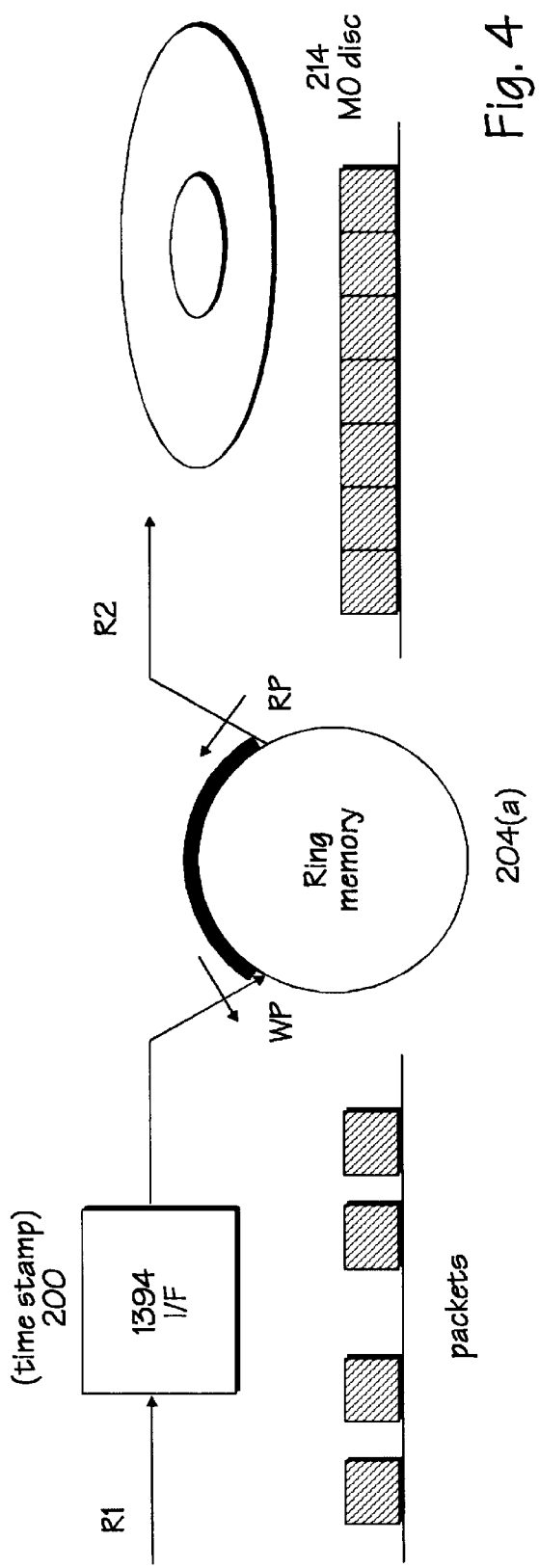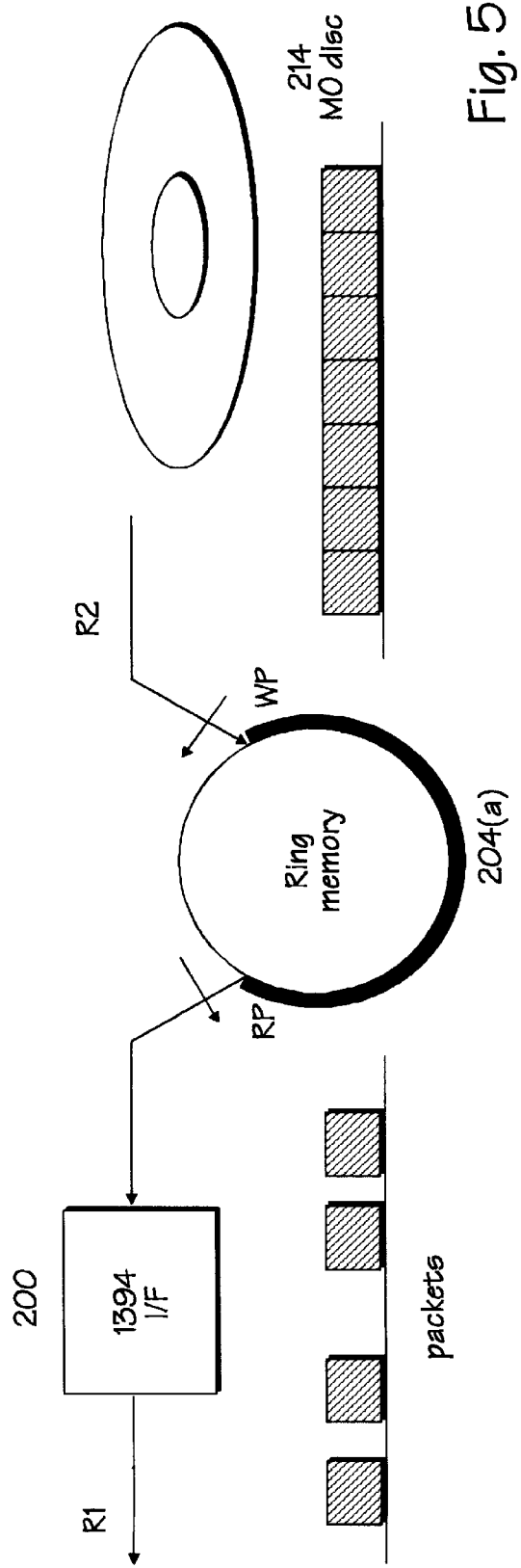

FRAME-ACCURATE EDIT AND PLAYBACK IN DIGITAL STREAM RECORDING

FIELD OF THE INVENTION

The present invention relates to digital video recording and editing systems and, in particular, those systems which find application in editing and playback operation on MPEG digital video streams.

BACKGROUND

A standard (the MPEG standard) for the coded representation of picture, audio and mult-media information has been adopted by the International Standards Organization (ISO-IEC) on recommendations of the Moving Picture Experts Group (MPEG). The MPEG standard addresses the compression, decompression and synchronization of video and audio signals. The MPEG video algorithm can compress video signals to an average of approximately one half to one bit per coded pixel. At a compressed data rate of 1.2 Mbps a coded resolution of 352×240 at 30 HZ is often used and the resulting video quality is comparable to VHS.

It is most basic form, an MPEG system stream is made up of two layers. A system layer which contains timing and other information needed to demultiplex the audio and video streams and to synchronize audio and video during playback, and a compression layer that includes the audio and video streams. In general, an MPEG decoding system extracts the timing information from the MPEG system stream and demultiplexes the video and audio streams from the system stream, routing each to an appropriate decoder. A video decoder decompresses the video stream while an audio decoder decompresses the audio stream. Both the video decoder and the audio decoder are provided with timing information which has been extracted from the MPEG system stream.

Such a MPEG decoder finds application in a (digital satellite system) DSS integrated receiver decoder (IRD) as shown in FIG. 1. Antenna 1 receives MPEG signals from DSS satellites and provides the signals to IRD 2 for decoding. IRD 2 decodes the DSS signal and provides outputs to the television (TV) 3 to allow a user to view television programming. At the same time, undecoded signals are transmitted, for example by way of a computer network, to a magnetic optical (MO) disk drive 4 and recorded. Alternatively, MO drive 4 may output previously recorded data through IRD 2 for decoding and ultimate transmission to TV 3 for display. IRD 2 and MO drive 4 can be user controlled through the use of a remote control 5.

The MPEG standard defines a hierarchy of data structures in the video stream. To begin, a video sequence starts with a sequence header and includes one or more groups of pictures. The video sequence typically ends with an end of sequence code. A group of pictures may include a header and a series of one or more pictures intended to allow random access into the sequence. A picture is the primary coding unit of a video sequence and consists of rectangular matrices presenting luminance (y) and chrominance (C and C) values. Each picture is made up of a number of slices with each slice being one or more contiguous macroblocks. The order of the macroblocks within a slice is from left to right and top to bottom. Slices are important in the handling of errors. If the bit stream contains an error, the decoder can skip to the start of the next slice. Thus, having more slices in the bit stream allows better error concealment but uses bits that can otherwise be used to improve picture quality. A macroblock is a sixteen pixel by sixteen line section of luminance components and the corresponding eight pixel by eight line section of the two chrominance components. Thus, a macroblocks contains four luminance blocks, one CB block and one CR block.

MPEG streams use inter-picture coding. That is, much of the information in a picture within a video sequence is recognized as being similar to information in a previous or subsequent picture. The MPEG standard takes advantage of this temporal redundancy by representing some pictures in terms of their differences from other (reference) pictures. This inter-picture coding is accomplished using three defined picture types; intra pictures (I-pictures), predicted pictures (P-pictures) and bidirectional pictures (B-picture).

I-pictures are coded using only information present in the picture itself. Thus, I-pictures provide potential random access points into the compressed video data. P-pictures are coded with respect to the nearest previous I- or P-picture in a technique called forward prediction. Like I-pictures, P-pictures may serve as a prediction reference points for B-pictures and future P-pictures. However, P-pictures use motion compensation to provide more compression than is possible with I-pictures. Unlike I-pictures, P-pictures can propagate coding errors because P-pictures are predicted from previous reference pictures. B-pictures are pictures that use both a past and future picture as a reference. This technique is called bidirectional of prediction and provides the most compression. B-pictures do not propagate errors because they are not used as a reference for orher pictures. Bidirectional prediction also decreases the effective noise by averaging two pictures.

The MPEG algorithm allows a encoder to choose the frequency and location of I-pictures. This choice is typically based on the application's need for random accessibility and the location of scene cuts in a video sequence. In applications where random access is important, I-pictures are typically inserted into the stream two times per second. The encoder also chooses the number of B-pictures between any pair of reference pictures. This choice is based on factors such as the amount of available memory in the encoder and the characteristics of the material being coded.

The MPEG encoder reorders pictures in the video stream to present the pictures to a decoder in the most efficient sequence. In particular, the reference pictures needed to reconstruct B-pictures are sent before the associated B-pictures. However, for the system illustrated in FIG. 1, the recorded picture order i.e., the order of recording on an MO disk in MO drive 4, is typically not the same as the original picture order. Video decoders present in IRD 2 typically include several frame memories in order to decode and rearrange the pictures into the original order for display. During playback therefore, a time lag exists between the data read by MO drive 4 from an associated MO disk and the picture displayed on TV 3. Unfortunately, the time lag between the reading of the data and the ultimate display is not a constant. Instead, the time lag depends upon the type of encoding used. If a number of I-pictures are present in the video sequence, the time lag is generally small. However, where many B-pictures are used in the stream, the time lag may be significantly large.

The time lag presents difficulties for an editor observing video sequences played on TV 3. The editor would typically like to select one picture as an editing point and, therefore, frame accurate editing is required. Unfortunately, existing MPEG decoders do not allow for frame accurate editing because of the time lag associated with the reading of the stream and ultimate playback.

SUMMARY OF THE INVENTION

Accordingly, the present invention provides, in one embodiment, a method of editing an MPEG stream. As an MPEG stream is playing out, e.g., from an MO drive or other source, an edit point is indicated. When the edit point is indicated, an entry is made into a computer readable table associated with the MPEG stream. The entry includes a first value representative of a presentation time stamp associated with a picture in the MPEG stream. The entry also includes a second value representative of a storage location on a media on which the MPEG stream being played out is stored.

BRIEF DESCRIPTION OF THE DRAWINGS

The present invention is illustrated by way of example and not limitation in the figures in the accompanying drawings in which like references indicates similar elements and in which:

FIGS. 4 illustrate signal flow in the MPEG recording system of FIG. 3 during record operations;

FIG. 5 illustrates signal flow in the MPEG recording system of FIG. 3 during playback;

DETAILED DESCRIPTION

A method and apparatus for frame accurate editing and playback in an MPEG digital system is described. In the following description, numerous specific details are set forth in order to provide a clear understanding of the present invention. However, upon review of this specification, those skilled in the art will appreciate that the present invention may be practiced without some or all of these particular details. In other instances, well known circuit designs and techniques have not been described in detail in order not to unnecessarily obscure the present invention.

Figure 1:
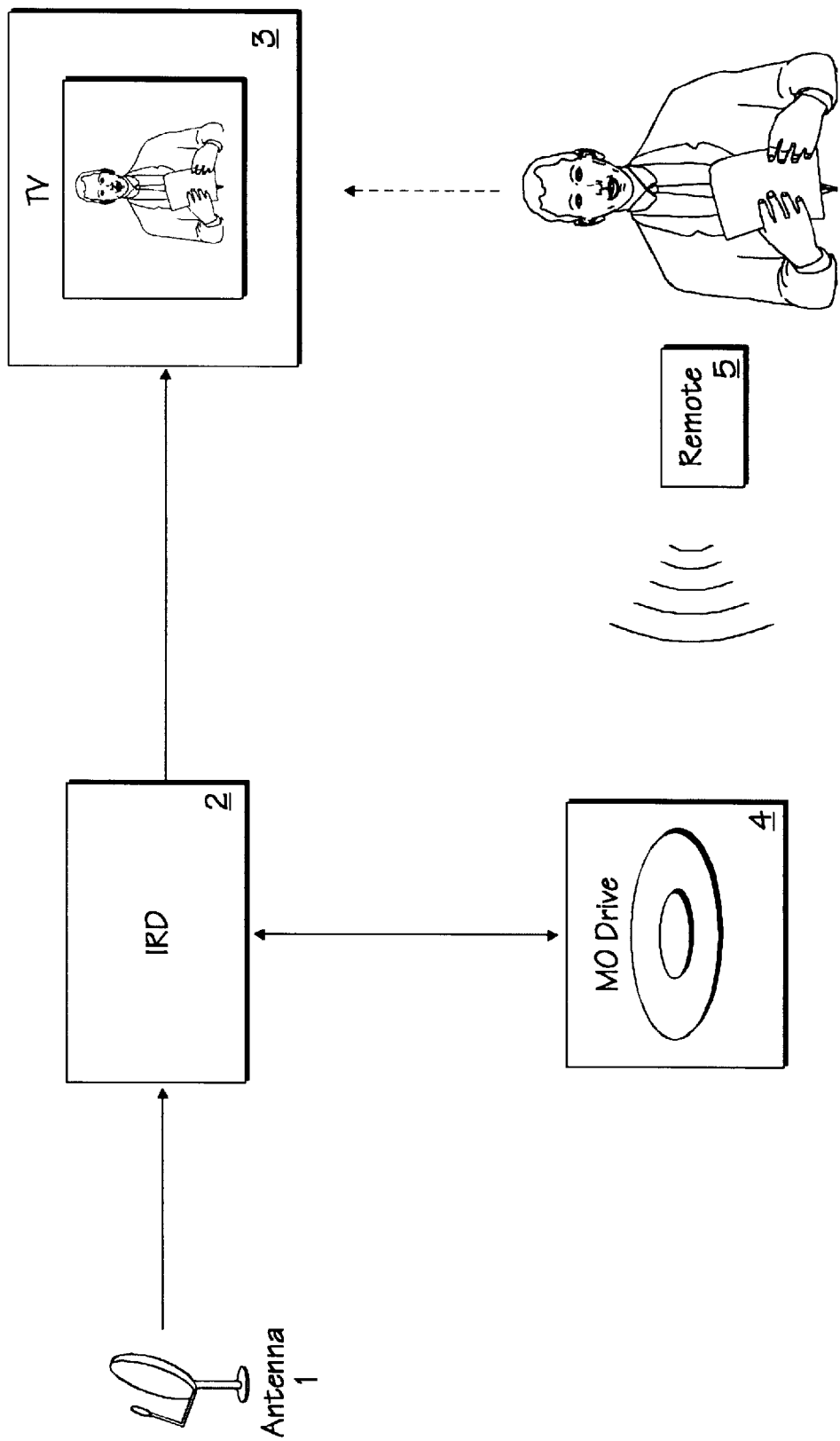
FIG. 1 illustrates an exemplary MPEG decoding and editing system.
Figure 2:
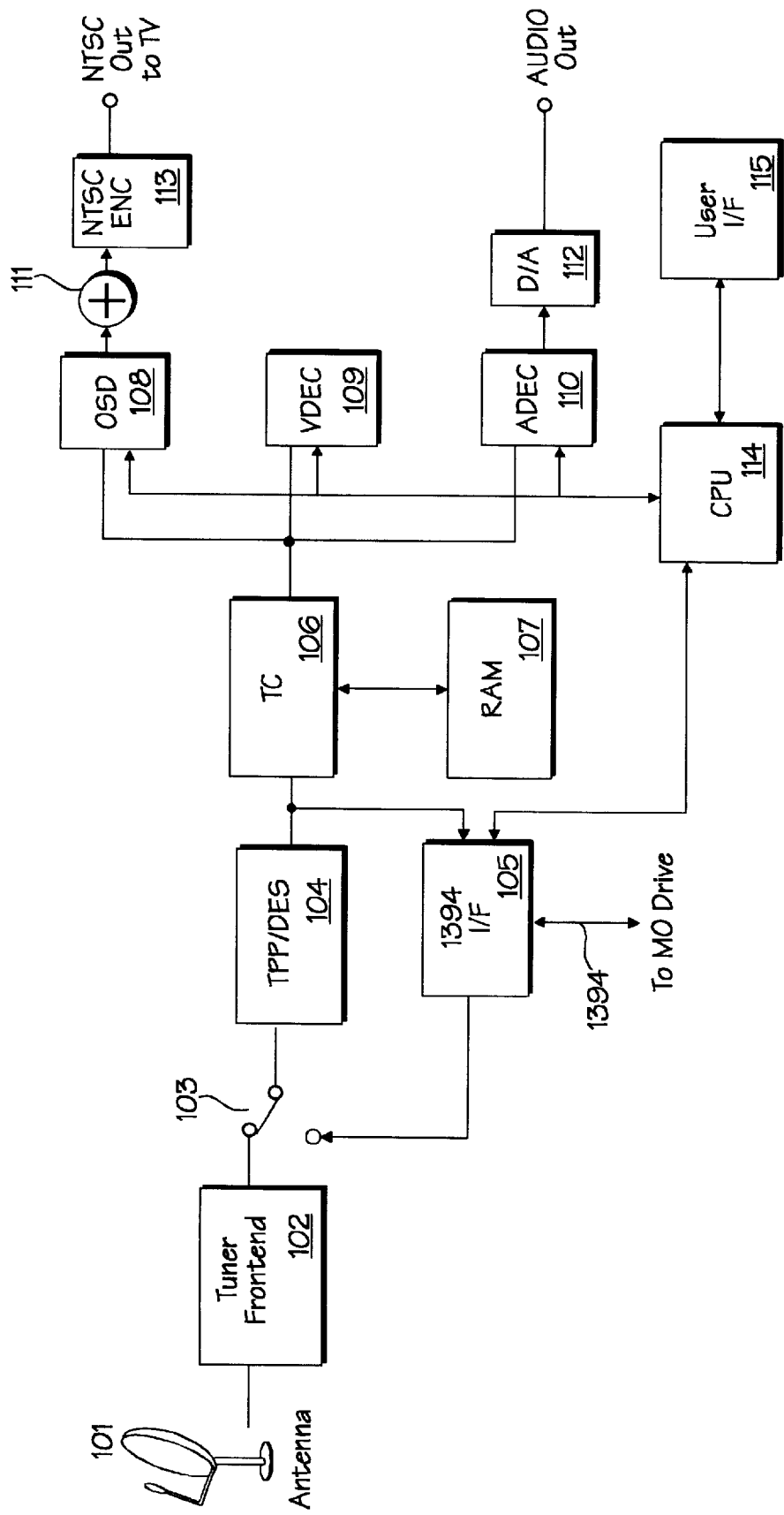
FIG. 2 illustrates an exemplary MPEG decoding system employing the methods of the present invention.

FIG. 2 illustrates an MPEG decoder incorporating the methods and apparatus of the present invention. Those skilled in the art will apprecieate that this decoder may find application in digital satellite television entertainment systems as well as other applications. Antenna 101 receives an encrypted MPEG stream (e.g., from a digital satellite system service provider) and provides an output to tuner/front-end 102. Tuner/front-end 102 allows a user to select a desired channel and provides amplification for the encrypted MPEG stream. Output signals from tuner/front-end 102 are routed through switch 103 to TransPort Parser/Data Encyrption standard (TPP/DES) block 104. TPP/DES 104 processes and decrypts the encrypted MPEG stream. The decrypted MPEG stream is then stored in RAM 107 under the control of traffic controller (TC) 106.

If desired, recording of the decrypred MPEG stream may be accomplished through 1394 interface (I/F) 105 which is connected to MO drive 4 via a computer network. Although a variety of computer or other digital networks may be used, a preferred embodiment makes use of a bus architecture defined by the Institute of Electrical and Electronic Engineers (IEEE). The preferred architecture is fully described in IEEE standards document 1394, entitled *Standard for High Performance Serial Bus* (hereinafter "IEEE 1394 Serial Bus Standard"). A typical serial bus having the IEEE 1394 Standard architecture is comprised of a multiplicity of nodes that are interconnected via point-to-point LINKs, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE 1394 Serial Bus Standard may be used as an alternate bus for the parallel backplane of a computer system, as a low cost peripheral bus, or as a bus bridge between architecturally compatible buses. The IEEE 1394 Serial Bus Standare specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video data. The transactions for each type of bus access are comprised of at least on "subaction", wherein a subaction is a complete one-way transfer operation.

During recording, the output of TPP/DES 104 is provided to MO drive 4 through 1394 interface 105. During playback, switch 103 is connected to 1394 interface 105 so that a playback stream from MO drive 4 is input to TPP/DES 104. Such a playback stream will have its encryption bytes set to indicate that the data is no longer encrypted. Thus, the stream will avoid the decryption engine present within TPP/DES 104.

Traffic controller 106 distributes the stored data in RAM 107 to the appropriate decoders. Video decoder 109 receives video data and decodes it. A video frame memory used by video decoder 109 may be part of RAM 107. Audio decoder 110 decodes audio data provided via TC 106. Decoded audio data is then provided to an audio output through digital-to-analog (D/A) converter 112.

Decoded video data is provided through mixer 111 along with any on-screen display data from on-screen display (OSD) block 108 to NTSC encoder 113. On-screen display data may include upcoming program information, system configuration information or other data. NTSC encoder 113 encodes the video data in standard NTSC format and provides the analog NTSC signal to TV 3. All of the above blocks are under the control of CPU 114. CPU 114 also controls the user interface 115 which accepts signals from remote control 5 or from a front panel control (not shown).

Figure 3:
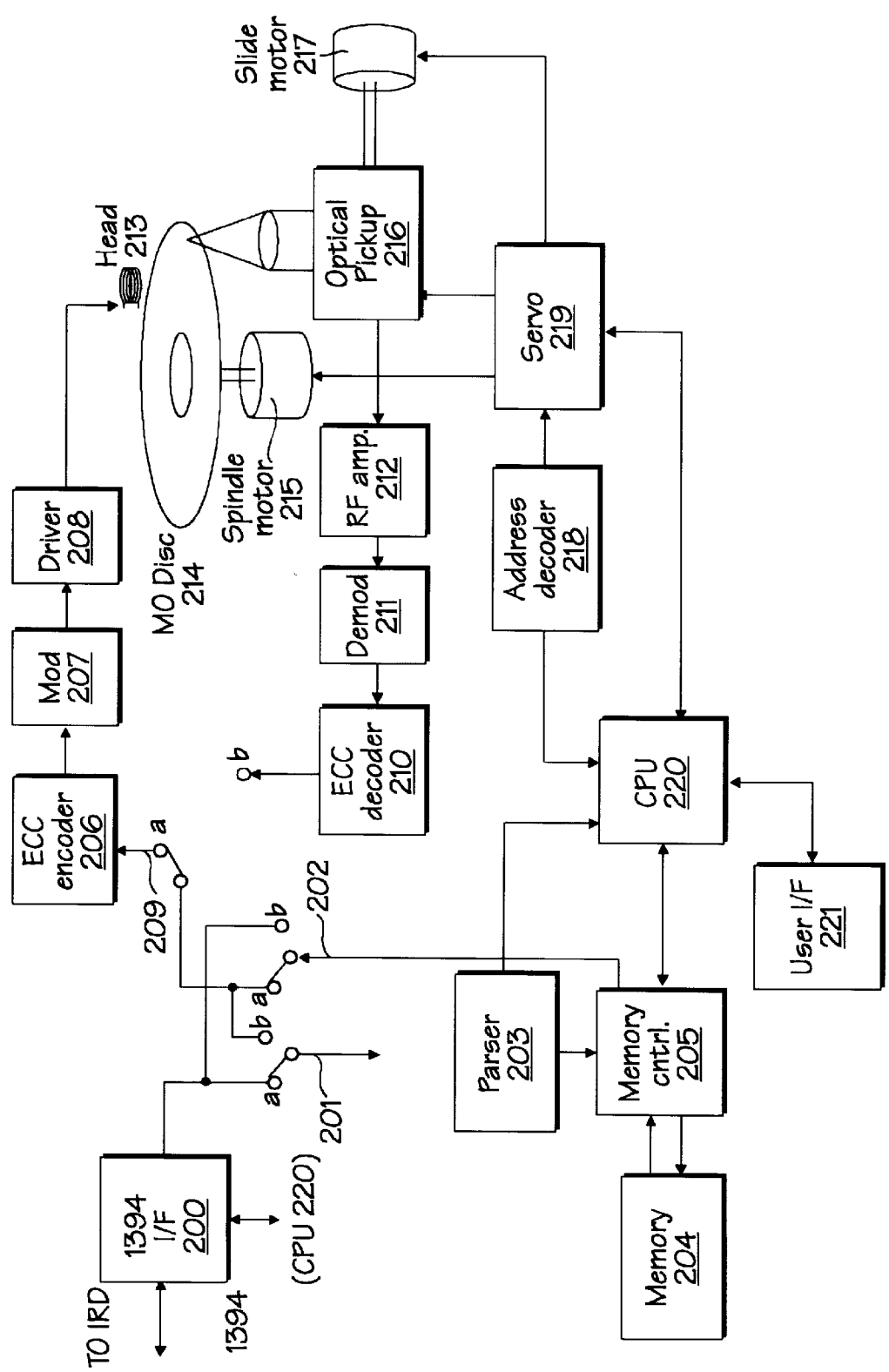
FIG. 3 illustrates an exemplary MPEG recording system using the methods of the present invention.

FIG. 3 illustrates an example of MO drive 4. In recording mode, switches 201, 202 and 209 are connected to position (a). 1394 interface 200 receives the decrypted MPEG stream from IRD 2 and provides it to parser 203 via switch 201. The stream is parsed by parser 203 and stored in memory 204 under the control of memory controller 205. The output from memory 204 is transmitted via switch 209 to error correction code (ECC) encoder 206 for appropriate error correction encoding. The encoded signal is modulated in modulator 207 and D/A converted in driver 208. The resulting signal is then recorded on MO disk 214 using head 213.

During playback, switches 201, 202 and 209 are connected to position (b). Optical pickup 216 reads signals on MO disk 214 and provides them to RF amplifier 212 and demodulator 211. The resulting signal from demodulation 211 is provided to ECC decoder 210 for error correction decoding. The output of ECC decoder 210 is parsed in parser 203 and buffered in memory 204 under the control of memory controller 205. The signals are then transmitted through 1394 interface 200 to IRD 2 for playback on TV 3.

During both recording and playback, address decoder 218 decodes the current sector address on MO disk 214 and provides it to CPU 220 and servo controller 219. Servo controller 219 controls spindle motor 215, slide motor 217 and optical pickup 216. CPU 220 controls servo controller 219, memory controller 205 and user interface 221. User interface 221 provides an interface with front panels controls (not shown) and/or remote control 5.

FIGS. 4 and 5 present a simplified representation of signal flow through MO drive 4. FIG. 4 illustrates signal flow during recording. Packets arrive intermittently from IRD 2 at 1394 interface 200 at data rate R1. The packets are time stamped upon arrival and stored in ring buffer 204a. Ring buffer 204a is part of memory 204. If X represents the data size on the most outside track of MO disk 214, the capacity of ring buffer 204a is chosen to be larger than X.

A write pointer (WP) indicates the memory address within ring buffer 204a at which incoming data from IRD 2 is to be written. Similarly, a read pointer (RP) indicates the address of ring buffer 204a from which data is to be read out to MO disk 214 for storage. Data is read from ring buffer 204a and recorded on MO disk 214 at a data rate R2, equal to or greater than R1. WP and RP are controlled by memory controller 205.

Initially, WP and RP are set at the same address. As packets are received, writing begins and WP is incremented as each packet is received. When an amount of data corresponding to X has been stored in ring buffer 204a, reading (i.e., storage on MO disk 214) commences. Thus, during record operations ring buffer 204a will be written to and read from at data rates R1 and R2, respectively. By beginning the read operation only after X-amount of data has been stored in ring buffer 204a, packets are read out of ring buffer 204a without any gaps, as illustrated in FIG. 4. Writing to buffer 204a stops just before ring buffer 204a would overflow.

Because R2 is faster then R1, eventually RP will catch with WP. When this occurs, a ring buffer underflow occurs and reading ceases. When an amount of data equal to X has again been stored, reading recommences. This process continues until all data from IRD 2 has been written to MO disk 214.

Playback operation is illustrated with reference to FIG. 5. Each packet is read from MO disk 214 at rate R2 with no gaps between packets. Packets are read from MO disk 214 and written to ring buffer 204a at a location indicated by write pointer WP. Packets are then read out of ring buffer 204a to 1394 interface 200 at locations corresponding to read pointer RP. Initially, WP and RP are set at the same address. Writing from MO disk 214 then begins and WP is incremented at the rate R1. If WP again catches up with RP, this indicates that ring buffer 204a is full and writing stops. At this point, reading commences with RP being incremented as each packet is read out of ring buffer 204a. When the amount of data remaining in buffer 204a falls below a preset threshold, writing again resumes. Because R2 is greater than R1, ring buffer 204a frequently fills, causing the above process to be repeated.

1394 interface 200 operates asynchronically with respect to ring buffer 204a and, accordingly, injects each packet into the 1394 network at the packet's stamped time. This ensures that the time interval between packets will be the same as the originally recorded stream.

Figure 6:
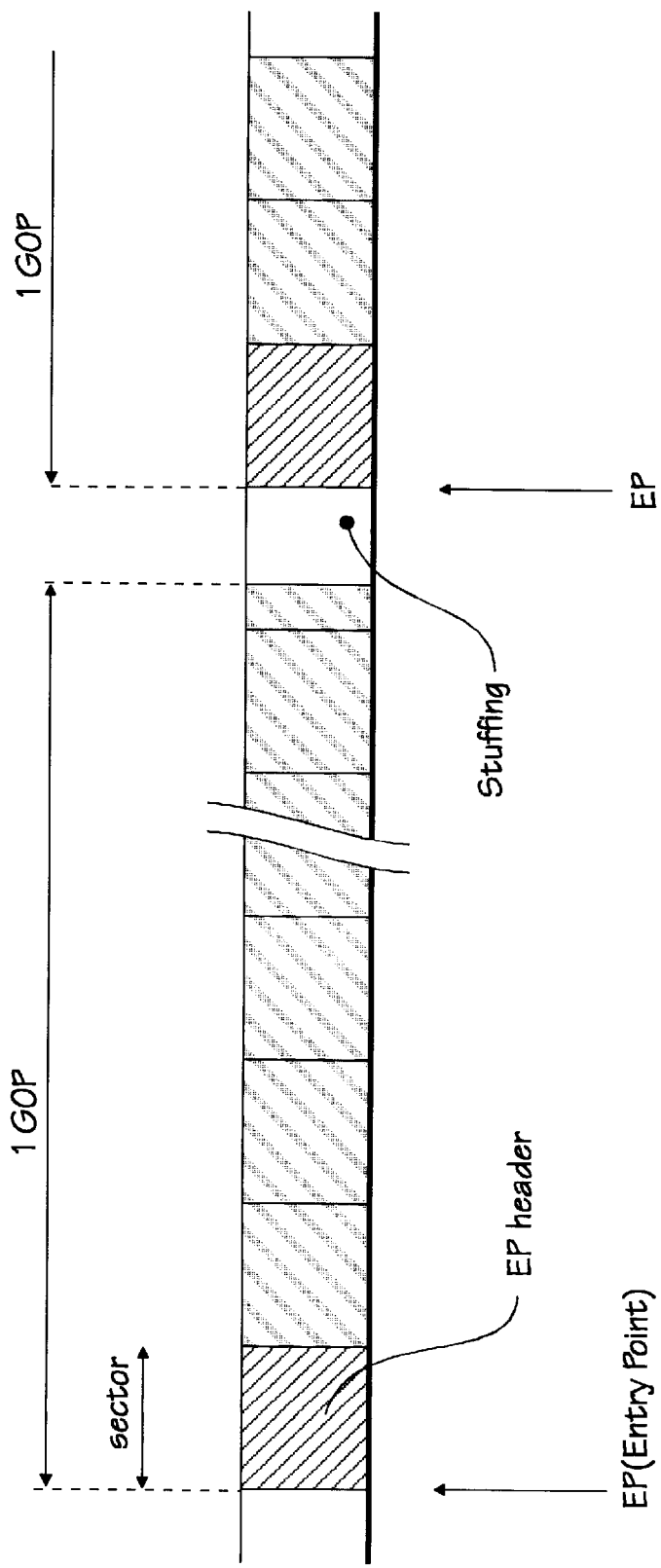
FIG. 6 illustrates an exemplary track on a magnetic optical (MO) storage media appropriate for use with the MPEG recording system of FIG. 3.
Figure 7:
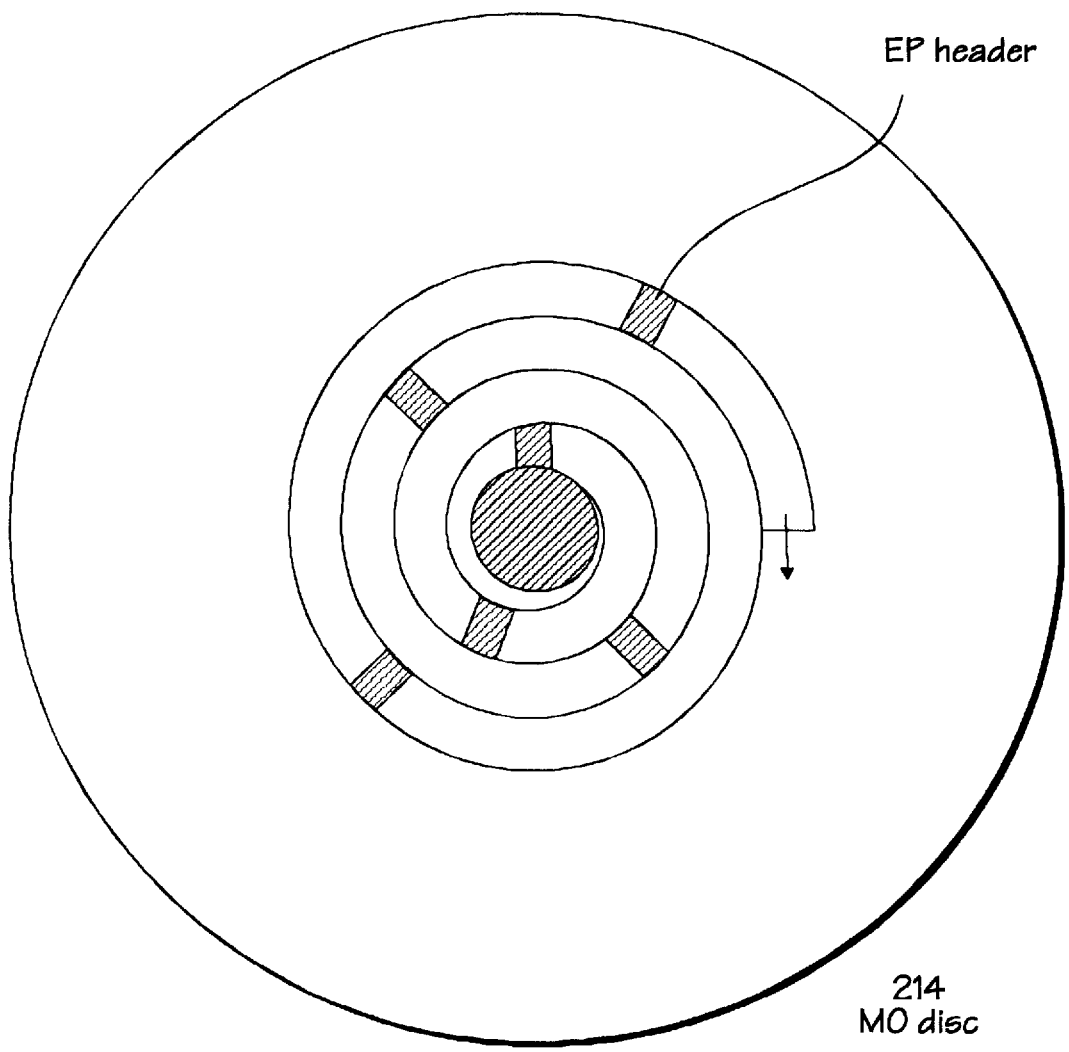
FIG. 7 illustrates several tracks of the type shown in FIG. 6 as recorded on an MO disk associated with the recording system of FIG. 3.

FIG. 6 illustrates a exemplary track on MO disk 214. MO disk 214 is sectorized, with the sectors being, for example, one kilobyte. Each sector has a unique sector address. The first sector in a group of pictures (GOP) includes an entry point (EP) header. The EP header includes an EP header code which indicates the start of a GOP. Thus, every GOP is recorded on MD disk 214 such that it begins at the start of a sector. If a GOP ends in the middle of a sector, the remainder of the sector will be filled with "stuffing information" so that the next GOP will begin at the beginning of the next sector. As shown in FIG. 7, data is recorded from inside to outside on MO disk 214. However, because the data is of variable length, GOP length differs between GOPs.

Figure 8:
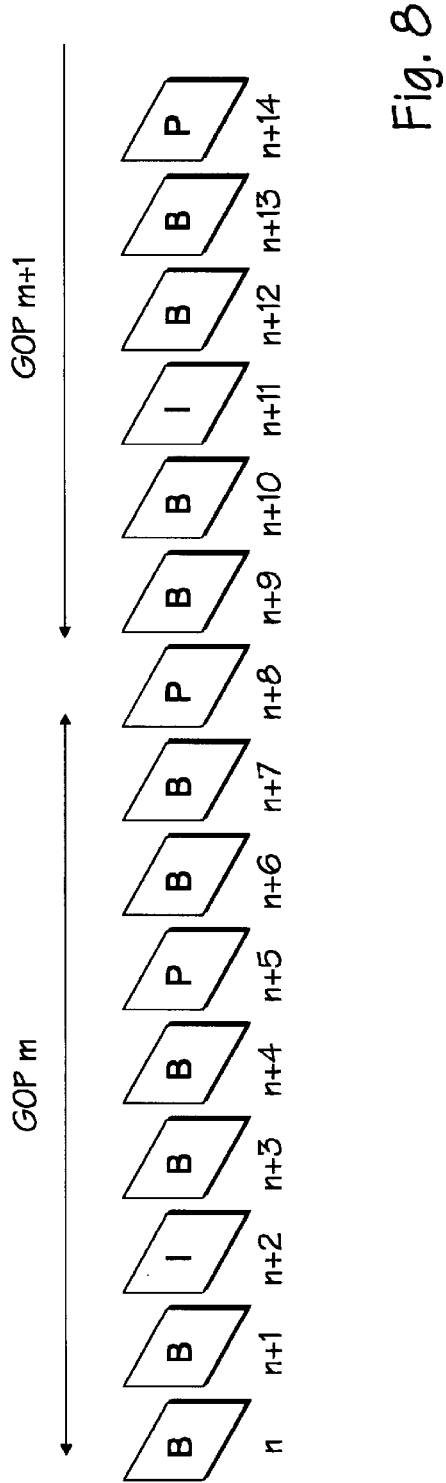
FIG. 8 illustrates an exemplary MPEG video stream.

FIG. 8 shows an example of an original MPEG video sequence. A GOP consists of I-, P- and B-pictures. Each picture is given an incremental number in the temporal order shown in FIG. 8.

Figure 9:
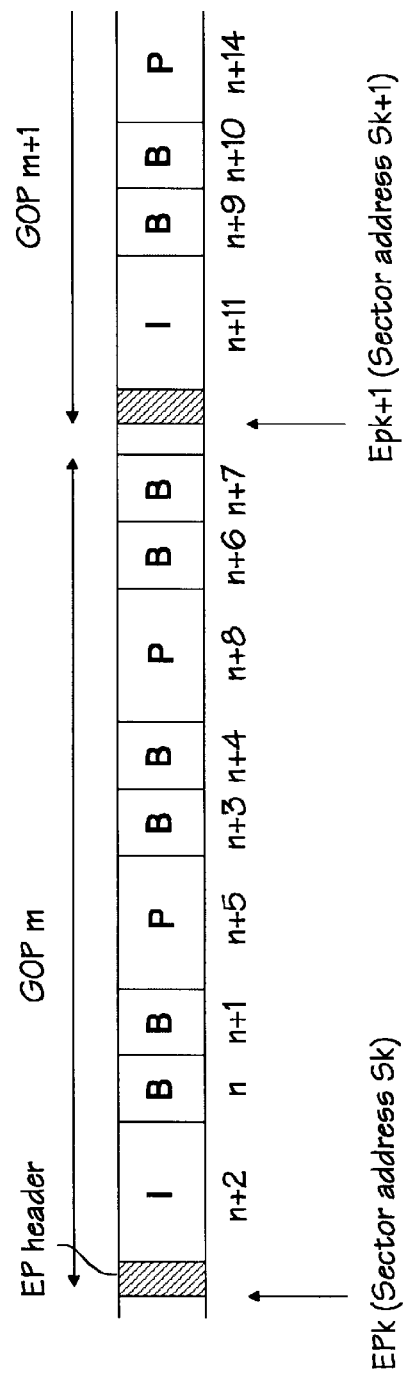
FIG. 9 illustrates the MPEG video stream of FIG. 8 as recorded on an MO disk appropriate for use with the recording system of FIG. 3.

FIG. 9 shows the same video data as FIG. 8 after being MPEG-encoded and transmitted to IRD2. This sequence is also recorded on MO disk 214. To simplify the figures, audio and other data has not been shown. Note that the recorded picture order of FIG. 9 is different from the original stream order of FIG. 8. In GOP m, illustrated in FIG. 8 and 9, all the pictures except picture n and n+1 are decodable using only the data of GOP m. That is, pictures n+2 through n+8, are all decodable using the data of pictures n+2 through n+8. Therefore, to decode these picture, optical pickup 216 may commence reading with EPk. That is, the EP header corresponding to sector address Sk. However, to decode B-pictures n and n+1, optical pickup 216 must commence reading with the previous EP (EPk-1) which is not shown in FIG. 9. Similarly, to decode pictures and n+9 and n+10 of GOP n+1, optic pickup 216 must commence reading from EPk, corresponding to GOP m, and not EPk+1, corresponding to GOP n+1, because the data required to decode pictures n+9 and n+10 can only be found in GOP m and not solely within GOP m+1.

As mentioned above, there is a time lag between data read by MO drive 4 and the picture displayed on TV 3. In order to solve the time lag problem, IRD 2 and MO drive 4 exchange presentation time stamps (PTSs) associated with each picture in the MPEG stream. Each picture has a unique PTS and the PTS is used as an ID number. MO drive 4 controls each edit point (see below) with the sector address of its EP and PTS. Using this scheme, frame accurate editing and playback are possible. Although described with reference to two separate components (IRD 2 and MO drive 4), those skilled in the art will appreciate that the methods described below may occur in a single unit.

To illustrate the process, consider the recording mode. While recording the MPEG stream, MO drive 4 constructs an EP-PTS table (see table 1) consisting of entry points (EP), picture types, and PTSs. This table resides in memory 204. Alternatively, CPU 220 may store the table in an internal RAM or cache. When MO drive 4 records the streams shown in FIG. 9, the EP-PTS table will be as shown in table 1.

TABLE 1

| Entry Point | Picture Type | PTS |
| --- | --- | --- |
| Sk | I | t(n + 2) |
| Sk − 1 | B | t(n) |
| Sk − 1 | B | t(n + 1) |
| Sk | P | t(n + 5) |
| Sk | B | t(n + 3) |
| Sk | B | t(n + 4) |
| Sk | P | t(n + 8) |
| Sk | B | t(n + 6) |
| Sk | B | t(n + 7) |
| Sk + 1 | I | t(n + 11) |
| Sk | B | t(n + 9) |
| Sk | B | t(n + 10) |
| Sk + 1 | P | t(n + 14) |

In table 1, t(n) indicates the PTS of picture n. Other variables representative of the PTS (for example, an encrypted PTS) may also be used. Parser 203 parses the stream and obtains the picture type and PTS in each arriving picture. This information is provided to CPU 220 by parser 203 and allows CPU 220 to construct the EP-PTS table. At the same time, address decoder 218 provides CPU 220 with entry point addresses on MO disk 214 where the information is recorded.

Note that the entry points of B-pictures n and n+1 is Sk-1 and not Sk. This is because the data required to generate B-pictures n and n+1 requires data from GOP m−1 and not GOP m. Similarly, the EP of B-pictures n+9 and n+10 is Sk and not Sk+1.

Figure 10:
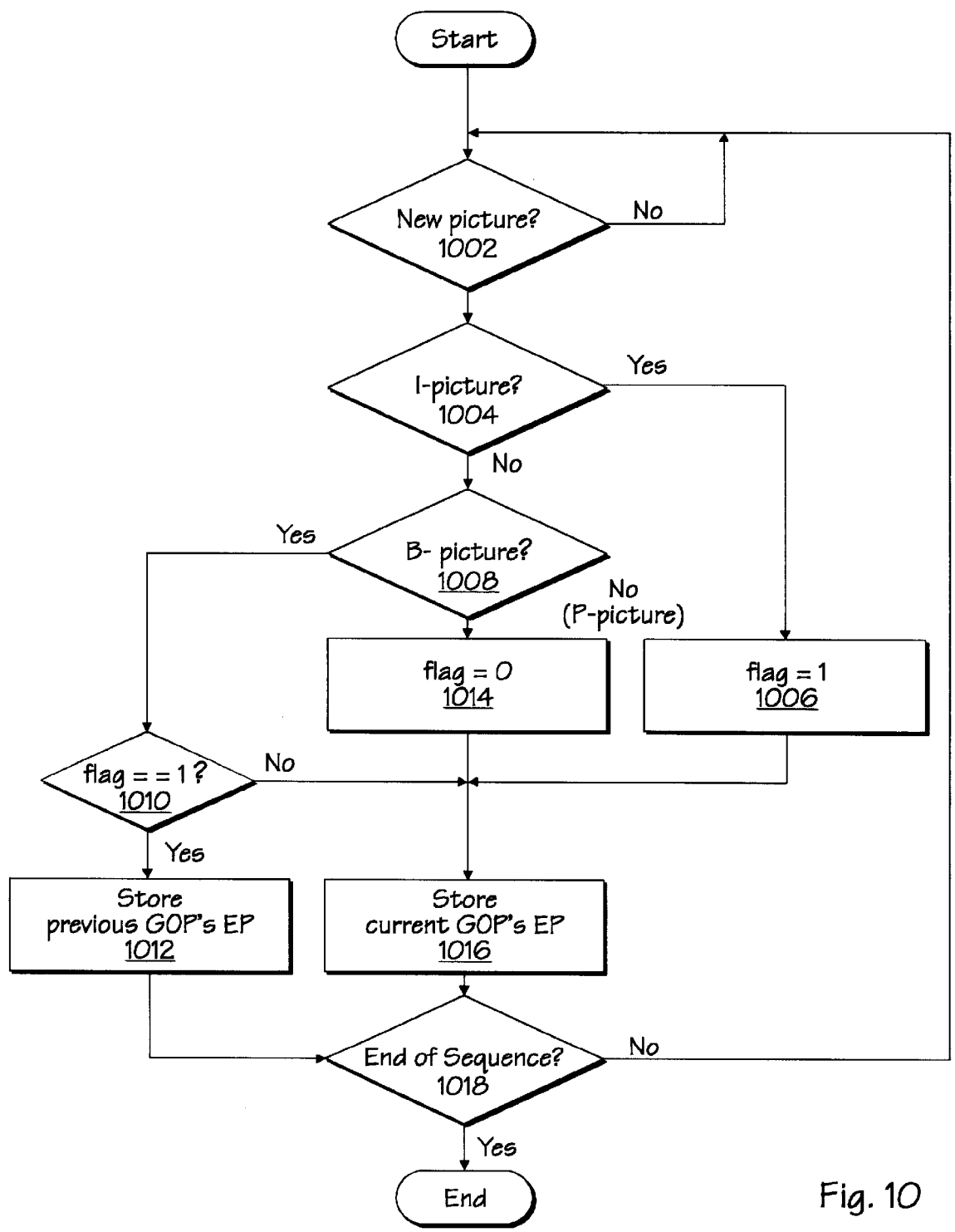
FIG. 10 is a flow diagram illustrating a process of producing an entry point table in accordance with present invention.

CPU 220 writes the appropriate EP into the EP-PTS table in memory 204 according to the method illustrated in the flow diagram of FIG. 10. At step 1002, CPU 220 determines whether a new picture is being presented. If so, CPU 220 executes step 1004 to determine whether the picture is an I-picture. If so, a flag is set equal to 1 at step 1006. Otherwise, CPU 220 proceeds to step 1008 to determine if the picture being presented is a B-picture. If so, the process moves to step 1010 to determine whether the current flag is set to equal 1. If the current flag is set equal to 1, then at step 1012 the EP stored is that of previous GOP. If CPU 220 determines that the picture is neither an I-picture nor B-picture, it is recognized that the picture is a P-picture and the current flag is set equal to 0 at step 1014. With the flag thus set, the process moves to step 1016 and the EP of the current GOP is stored in the table. At step 1018, CPU 220 determines whether the end of the picture sequence has been reached.

Note that the process of FIG. 10 distinguishes B-pictures that occurred before the first P-picture of a GOP and provides such B-pictures with an EP corresponding to the previous GOP. This is required because such B-pictures must be decoded from data present in the previous GOP as discussed above.

The EP-PTS table may store data from, say, the most recent 20 pictures. Of course, other data structures with varying numbers of pictures could be used. In all cases, the number of pictures stored in the table should be large enough to adequately cover the time lag discussed above. Each time a new picture arrives, CPU 220 may update the table, deleting old data and entering new data.

Figure 11:
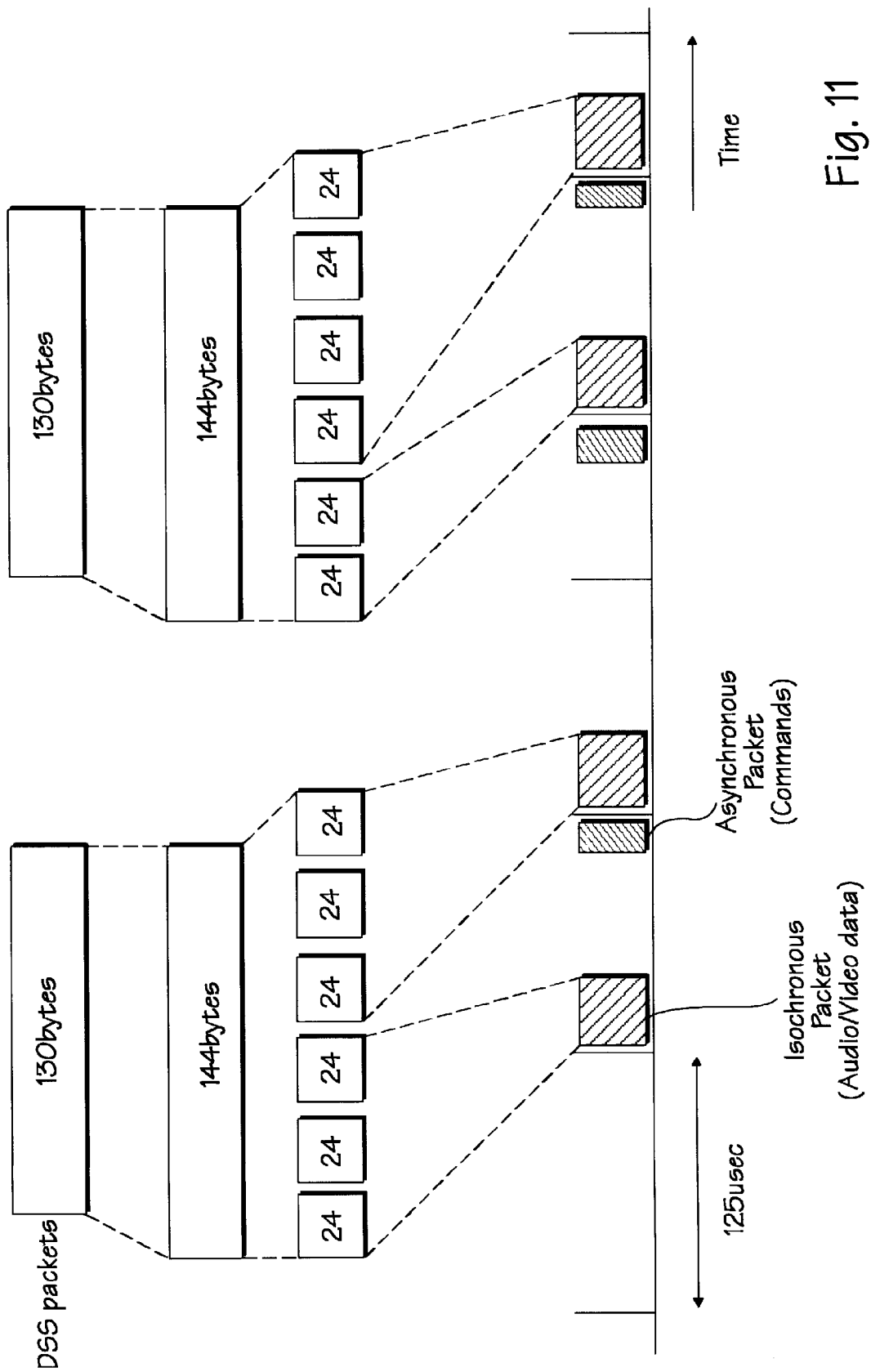
FIG. 11 illustrates the transmission of DSS packets on an IEEE 1394 network.

While MO drive 4 is recording the stream, a user is typically watching the decoded pictures on TV 3. The user may specify an edit point (i.e., the start point of a desired video track) using remote control 5. User interface 221 receives signals from remote control 5 and indicates to CPU 220 that an edit point has been selected. CPU 220 send a command to IRD 2 through 1394 interface 200 using asynchronous packet transmission as illustrated in FIG. 11. Alternatively, IRD 2 may receive the edit point command directly from remote control 5.

When CPU 114 of IRD 2 receives a command indicating that an edit point has been selected, CPU 114 obtains from video decoder 109 the PTS of the picture currently displayed on TV 3. This PTS will correspond to the edit point picture as selected by the user. CPU 114 then provides this PTS to MO drive 4 through the 1394 network. With this PTS, MO drive 4 (i.e., CPU 220) refers to the EP-PFS table for the EP and picture type of the picture. For example, if B-picture n+4 in FIG. 9 is selected as the edit point, IRD 2 returns t(n+4) to MO drive 4. MO drive 4 retrieves Sk as the entry point and B as the picture type from the EP-PTS table (see table 1).

Using this information, CPU 220 constructs a table of contents as illustrated in Table 2 and writes the table of contents to a designated area on MO disk 214. In table 2 it is assumed that B-picture n+4 is the first picture of the first track selected during the editing process. In this way, referring to the EP-PTS table, the table of contents is created. The table of content provides information regarding the video tracks selected during editing.

TABLE 2

| Track Number | EP sector address | Picture Type | PTS |
| --- | --- | --- | --- |
| 1 | Sk | B | t(n + 4) |
| 2 | ... | ... | ... |
| 3 | ... | ... | ... |
| ..... | ... | ... | ... |
| ... | ... | ... | ... |

During playback an EP-PTS table may also be created. However, this is only necessary if editing will be done during playback. During playback, parser 203 parses the playback data and CPU 220 constructs an EP-PTS table in memory 204 in a manner similar to that performed during recording. If the playback stream corresponds to that shown in FIG. 9, an EP-PTS table corresponding to that shown in table 1 will be created.

During playback, MO drive 4 reads the table of contents (TOC) stored on MO disk 214 and CPU 220 keeps track of the TOC data. The CPU 220 may store the TOC data in memory 204 for reading as necessary. If a user then selects track 1 using remote control 5, user interface 221 informs CPU 220 of the selection and CPU 220 obtains the sector address Sk and PTS t(n+4) from the TOC stored in memory 204. Using this information, MO drive 4 then begins to read MO disk 214 beginning at sector address Sk. CPU 220 sends PTS t(n+4) to IRD 2 via 1394 interface 200. CPU 114 in IRD 2 obtains the PTS and IRD 2 begins to decode the playback stream from I-picture n+2. The pictures n+2 and n+3 are decoded, but not displayed. Display begins with B-picture n+4, corresponding to the beginning of track 1 originally selected by the user through an edit point. In this way, track 1 is displayed from exactly the same pictures the user selected during the original recording/editing.

As indicated, during the playback operation, the EP-PTS table is not required. However, if a user wishes to edit during playback, the table will be necessary. The procedures are the same as discussed with respect to the recording mode. The user selects the first picture of a new track using remote control 5. After receiving such a command, MO drive 4 interrogates IRD 2 for the PTS of the displayed picture. IRD 2 provides the PTS to MO drive 4 and, referring to the EP-PTS table, CPU 220 obtains the EP and picture type. At this point, CPU 220 will also renew the table of contents. If the user has specified, for example, a new track between track 1 and 2, the new track is labeled as track 2 and the previous track 2 and all subsequent tracks are incremented by one track number.

As an application of this PTS control scheme, two point repeat play is available. Two point repeat requires playback from MO drive 4 repeatedly between two pictures as specified by a user. For example, assume that MO drive 4 plays back the stream shown in FIG. 9. Assume further that as TV 3 displays P-picture n+5, a user selects it as the start point of a track. Receiving such a command from the remote control 5, MO drive 4 interrogates IRD 2 for the PTS and obtains t(n+5). CPU 220 obtains the EP (Sk) and picture type (P) from the EP-PTS table as discussed above. Next, assume the user specifies B-picture n+10 as the end point. In a similar fashion to that described above, CPU 220 will obtain t(n+10) as the PTS of picture n+10, the EP (Sk+1) and picture type (B) from the EP-PTS table.

CPU 220 then controls optical pickup 216 so that it reads repeatedly the data from EPk to the end of B-picture n+10. Note that parser 203 parses each picture header, allowing CPU 220 to know whether optical pickup 216 has finished reading each picture. IRD 2 is provided with the PTS of the beginning and end point, namely t(n+5) and t(n+10). Thus, IRD 2 will start decoding from I-picture n+2 and end at B-picture n+10. However, only pictures from n+5 to n+10 are displayed repeatedly. The other pictures are decoded, in order to provide information necessary for the pictures between n+5 and n+10, but are not displayed.

Using the present invention, a reverse frame-by-frame mode is also possible. In MPEG decoding, forward frame-by-frame sequencing is easily accomplished. Each time a user sends a forward command, IRD 2 outputs one decoded picture to TV 3. However, backward frame-by-frame display is difficult because the MPEG stream is inter-framed compressed and the video decoder cannot decode a P- or B-picture using only the data of the P- or B-picture.

However, using the PTS control provided by the present invention, it is possible to reverse the display picture one frame at a time. For example, assume that TV 3 is currently displaying B-picture n+10 and it is paused. A user may send a reverse command to MO drive 4 using remote control 5. Upon receipt of the command, MO drive 4 will interrogate IRD 2 and get PTS t(n+10). CPU 220 will use this PTS to index the EP-PTS table and obtain the EP and PTS of the previous picture, n+9. That is, CPU 220 will be provided with EP Sk and PITS t(n+9). Note that the EP of picture n+9 is Sk and not Sk+1 because the B picture n+9 requires information within GOP m and not GOP m+1.

With this information, CPU 220 directs optical pickup 216 to begin reading from sector Sk and stop at the end of picture n+9. CPU 220 provides PTS n+9 to IRD 2 and IRD 2 begins decoding with I-picture n+2. During this time, B picture n+10 is still displayed on TV 3. However, when IRD 2 has finished decoded picture n+9, the decoded picture n+9 can be provided via NTSC decoder 13 to TV 3. Notice that although pictures from n+2 through n+9 are decoded, only picture n+9 is displayed. If the user sends another reverse command, the same procedure can be followed. Using the same technique, MO drive 4 can be controlled so as to provide a slow motion reverse mode.

The present invention also provides for data transfer rate optimization across the 1394 network. In DSS format, each video packet transmitted across the 1394 network has 130 bytes, as illustrated in FIG. 11. A packet header is attached at the beginning of each packet. For the example shown in FIG. 11, the packet header is 14 bytes long, yielding a total packet length of 140 bytes. The packet is also divided into six, 24-byte blocks.

According to the IEEE 1394 Serial Bus Standard, each cycle is 125 μsec. In one cycle, several blocks may be transmitted together as an isochronous packet. The maximum number of blocks (z) in any one cycle is set prior to data transfer.

If z is 2, the data transfer rate will be equal to 2×24 bytes/block×8 bits/byte×8000 cycles/sec=3.07 Mbytes per second. In practice, video packets for DSS applications are typically less than 5 Mbytes per sec., including z should be set equal to 4 for an efficient transfer. If, however, z is set to 8, too many time slots within the channel are assigned to the transfer and the efficiency of other bus communications will be degraded. Therefore, for efficient data transfer, the best value of z should be automatically selected depending on system requirements. Unfortunately, the DSS data stream itself does not provide any such data rate information.

In order to provide for optimum data transfer, 1394 interface 105 in IRD 2 is provided with a capability to calculate a maximum, minimum and mean data rate of the data stream. Thus, it will be possible to transfer data at a most efficient rate.

Figure 12:
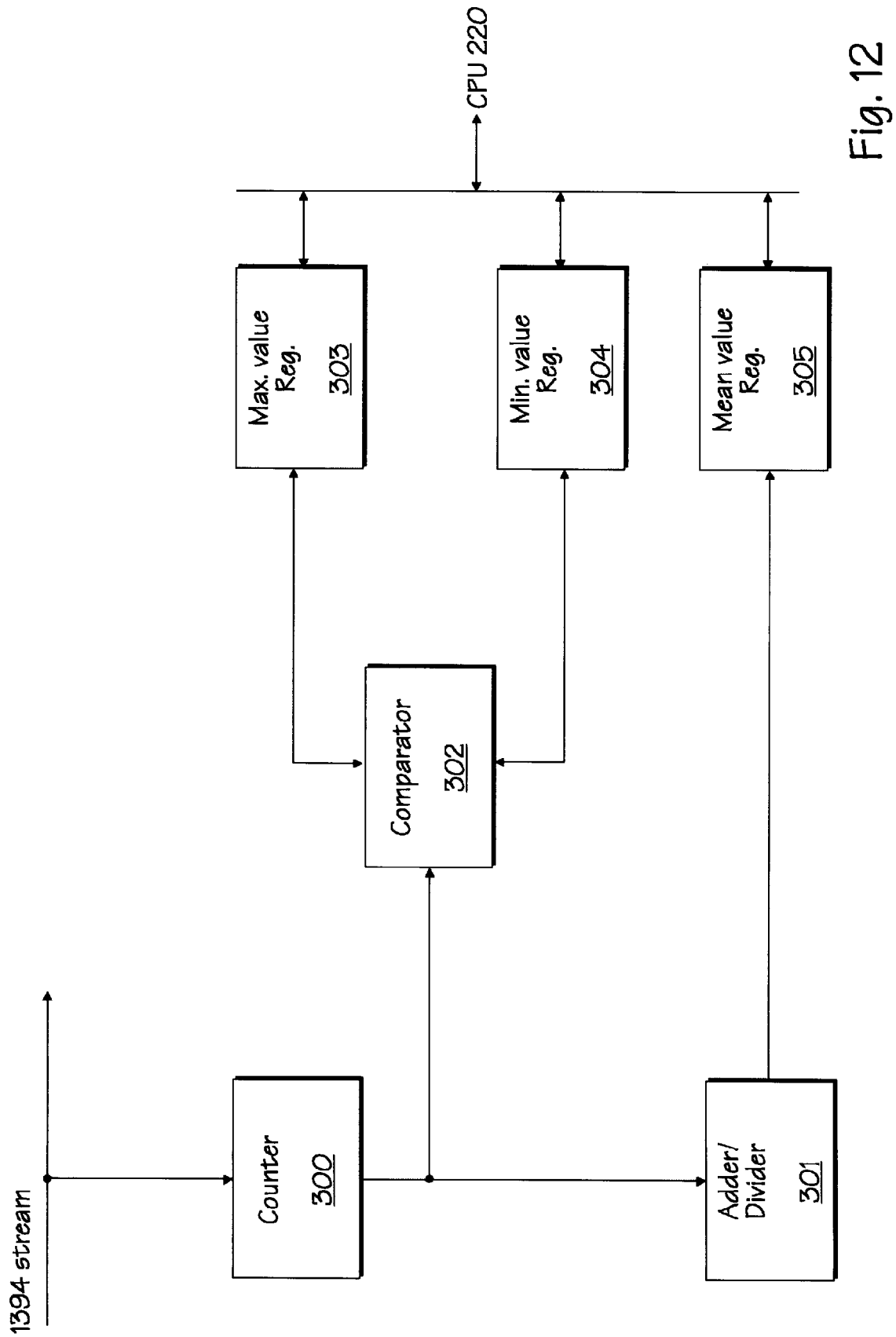
FIG. 12 illustrates a data rate circuit appropriate for use according to the present invention.

FIG. 12 illustrates one embodiment the data rate circuit of 1394 interface 105. Counter 300 counts the number of bytes in a DSS stream (sending or receiving) over a fixed time period. Adder/divider 301 calculates the mean value of this count over several time periods and stores it in mean value register 305. The first such value may also be stored in register 303 and register 304. Comparator 302 compares the current value of counter 300 with the previously stored maximum value in register 303 and minimum value in register 304. If the current value is greater than the value in register 303 or less than the value in register 304, the current value will be stored in register 303 or 304 as appropriate.

CPU 114 reads registers 303, 304 and 305 as required or on a periodic basis. The registers are reset when the stream halts or a different channel is selected. By selecting the maximum data rate of the stream from register 303, CPU 114 can select the best value for z to maximize the data transfer efficiency across the 1394 network. 1394 interface 200 in MO drive 4 may be provided with similar circuitry for optimizing data transfer in the opposite direction.

By knowing the data transfer rate, an estimate of the recording time remaining on an MO disk may be derived. Currently, such estimates are not readily available because the DSS format employs variable length coding schemes. In order to determine the amount of recording time remaining on an MO disk, MO drive 4 may be provided with the capability to estimate the remaining time. CPU 220 controls the recorded and the unrecorded sectors of an MO disk and has information regarding the number of unrecorded sectors. Because, the sector length is a fixed value, for example one kilobyte, the remaining capacity on the disk can be obtained. By dividing the remaining capacity by the mean data rate (obtained from register 305), an estimated remaining recording time is provided. Moreover, instead of dividing by the mean rate, dividing by the maximum or minimum rate (for registers 303 or 304, respectively) can provide estimate as to the minimum or maximum, respectfully, recording time remaining. CPU 220 may provide these estimated values to IRD 2 for display on TV 3.

Accordingly, a method and apparatus for frame accurate edit and playback in digital stream recording has been provided. Although the present invention has been described with reference to particular embodiments thereof, it will be appreciated that various modifications and alterations might be made by persons skilled in the art without departing from the broader spirit and scope of the invention. Therefore, the invention should be measured only in terms of the claims which follow.

What is claimed is:

1. A method for estimating recording time remaining on a computer readable media, comprising the steps of:

sectorizing said media into sectors having a predetermined length;

determining a data transfer rate for data to be recorded on said media; and calculating said estimated recording time using said predetermined length and said data transfer rate.

2. The method of claim 1 wherein said data transfer rate is an average data transfer rate.

3. The method of claim 1 said data transfer rate is a maximum observed transfer rate over a predetermined time interval.

4. The method of claim 3 wherein said step of calculating is performed using a divide operation.

5. The method of claim 2 wherein said predetermined length is one kilobyte.

* * * * *

UNITED STATES PATENT AND TRADEMARK OFFICE
CERTIFICATE OF CORRECTION

PATENT NO.   :   5,838,876
DATED        :   Nov. 17, 1998
INVENTOR(S)  :   Ryuichi Iwamura It is certified that error appears in the above-identified patent and that said Letters Patent is hereby corrected as shown below:

In column 3 at line 64 delete "apprecieate" and insert --appreciate--

In column 6 at line 49 delete "optic" and insert --optical--

In column 10 at line 20 delete "including" and insert --indicating--

Signed and Sealed this

Twenty-seventh Day of March, 2001

*Attest:*

NICHOLAS P. GODICI

*Attesting Officer*     Acting Director of the United States Patent and Trademark Office